April 10, 1956     D. L. LEGER     2,741,277
AUTOMATIC SAWING MACHINE FOR CUTTING PANELS
Filed March 14, 1955     6 Sheets-Sheet 1

INVENTOR
D. L. LEGER
BY
ATTORNEYS

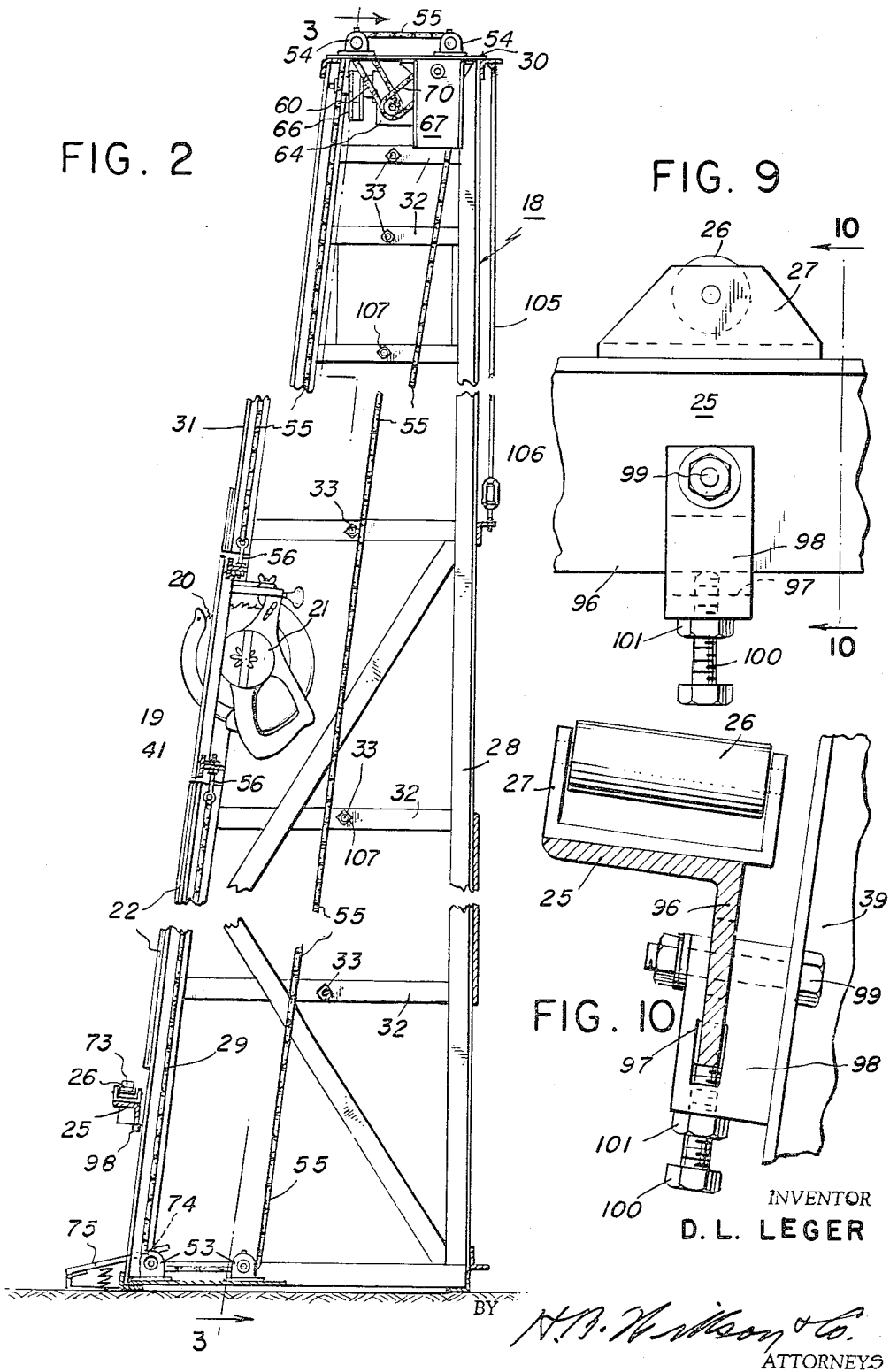

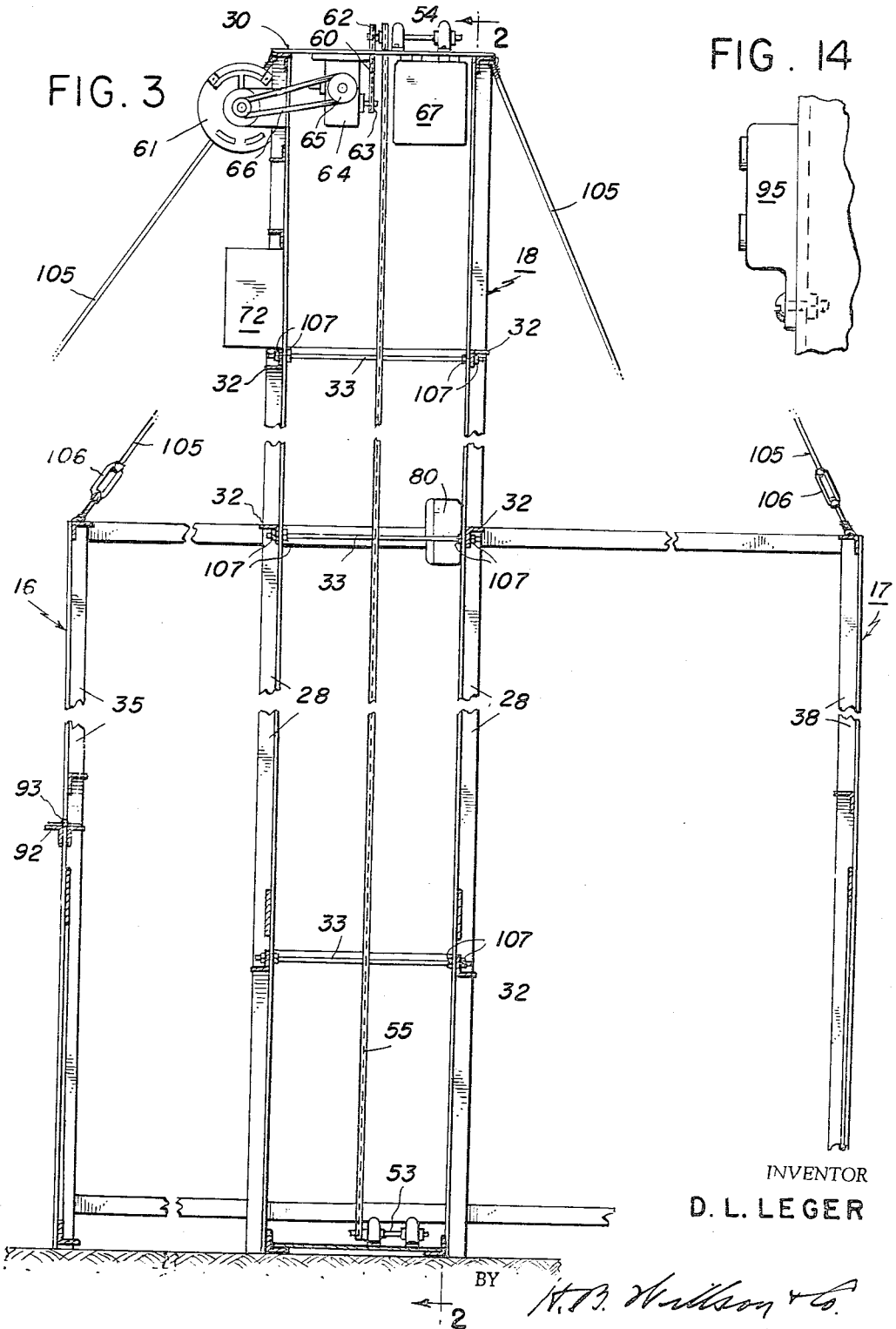

April 10, 1956  D. L. LEGER  2,741,277
AUTOMATIC SAWING MACHINE FOR CUTTING PANELS
Filed March 14, 1955  6 Sheets-Sheet 4
FIG. 4
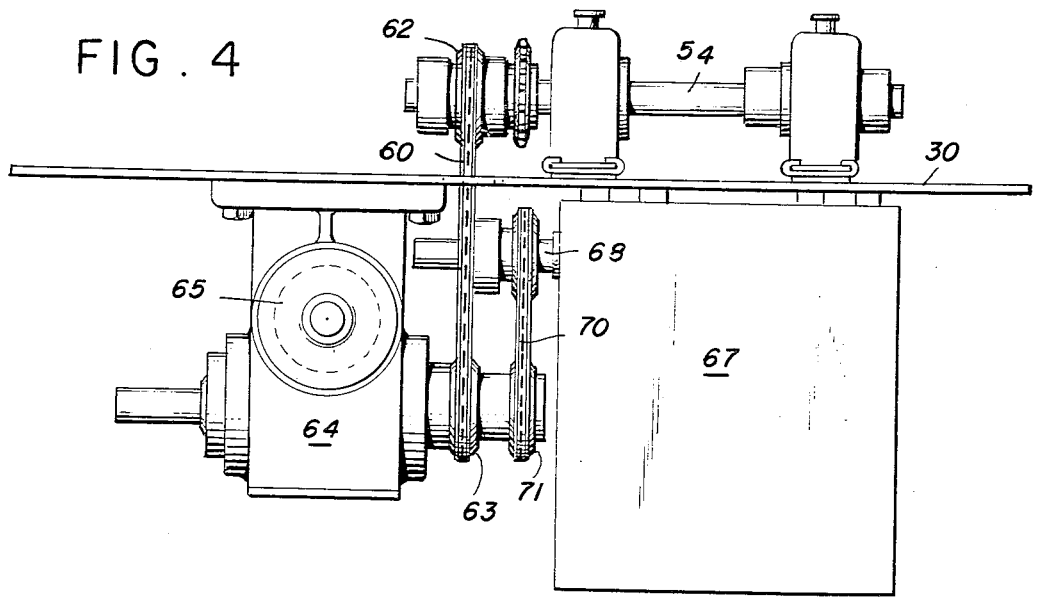
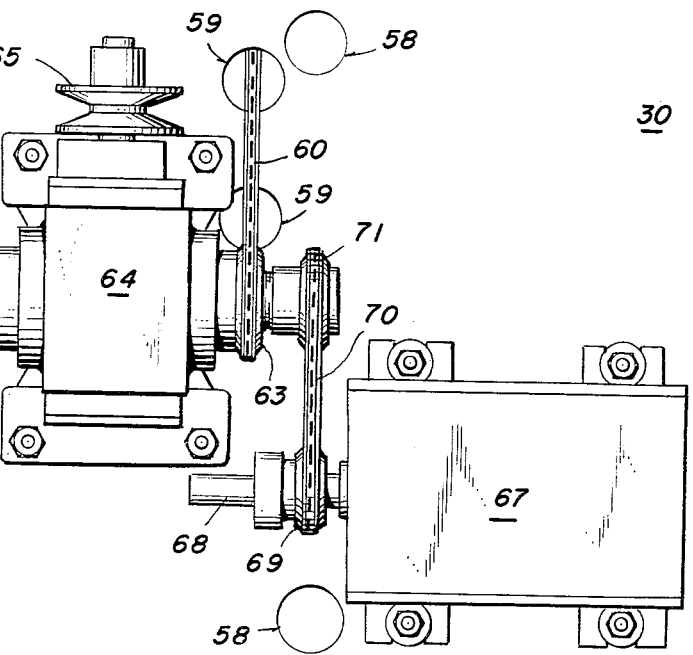
FIG. 5
INVENTOR
D. L. LEGER
BY H. B. Wilson & Co.
ATTORNEYS April 10, 1956  D. L. LEGER  2,741,277
AUTOMATIC SAWING MACHINE FOR CUTTING PANELS
Filed March 14, 1955  6 Sheets-Sheet 5

INVENTOR
D. L. LEGER

BY *H. B. Wilkin & Co.*
ATTORNEYS

April 10, 1956  D. L. LEGER  2,741,277
AUTOMATIC SAWING MACHINE FOR CUTTING PANELS
Filed March 14, 1955  6 Sheets-Sheet 6

INVENTOR
D. L. LEGER

BY *H. B. Willson & Co.*
ATTORNEYS

United States Patent Office 2,741,277
Patented Apr. 10, 1956

2,741,277
AUTOMATIC SAWING MACHINE FOR CUTTING PANELS

Delmas L. Leger, Salt Lake City, Utah, assignor to The Panel-Master Company, Salt Lake City, Utah, a partnership Application March 14, 1955, Serial No. 494,143

12 Claims. (Cl. 143—47)

This invention relates to wood sawing and particularly to sawing machines for cutting plywood and hard-board or composition panels of all kinds.

The invention contemplates an automatic panel cutting machine to be used pirmarily in lumber yards, planning mills and custom shops, the machine occupying but little floor space and enabling a single operator to rapidly cut a 4′ x 8′ or similar standard panel into small size pieces without the need of marking each piece of material to be cut.

The now commonly used machines for cutting large panels occupy considerable floor space since the panel is supported horizontally on a table and moved relative to the saw, and while the prior patent art discloses sawing machines having saws which travel vertically in cutting through material held stationary in an upright position, the present invention contemplates a main frame having upright right and left side sections with a gallows section between and rising above them, the gallows section having at its front inclined tracks for a slidable table carrying at its rear a motor driven circular saw, the front of the table or saw carriage being in the plane of inclined face plates on the two side sections and against which the panel to be cut rests with its lower edge supported on a horizontal ledge adjacent the bottom of the main frame, provision being made for mounting and adjusting the parts to insure accurate cuts being made by the saw as its carriage is moved by suitable motor driven means.

Another object of the invention is to provide in a machine of the above indicated character, adjustable rules graduated in units of linear measure and built into the panel-supporting faces of the side sections to enable the panel to be quickly positioned relative to the saw for cutting the exact size desired without measuring and marking the panel, the adjustment of the rules permitting them to be shifted to the right or left to accomplish accurate measurement to the face of the saw blade, since the saw carriage is adjustable within narrow limits and the blades used may vary in thickness.

Another object is the provision, in connection with a rule structure such as above indicated, of a foldable extension rule which, when not in use, may be folded up against an end of the main frame and held by a magnetic catch.

Another object is to provide a machine of the general character indicated above, with automatic electric means for controlling the operation of both the saw and slidable saw carriage, the latter being moved upwardly for the cutting stroke of the saw. The carriage is actuated by a chain and sprocket drive, and while separate electric motors may be used to move the carriage on its up and down strokes, a reversible motor with a three pole magnetic reversing contactor and a rotary limit switch are preferably employed in connection with a ledge switch closed by the weight of the panel on the supporting ledge and a foot switch or other manually actuated switch which cannot be closed until a panel is on the ledge.

Thus, when a panel is in position to be cut and the foot switch is closed, the saw will be driven and the carriage will travel upwardly until the foot switch is released. Upon such release the carriage will stop and the saw mill cease to rotate, but when the panel is removed from the ledge switch, the carriage will automatically return to its low starting position. However should the carriage be permitted to make its full upward stroke, the limit switch will cause carriage to stop until removal of panel from ledge switch causes it to be automatically returned to its starting position.

In connection with the above indicated automatic electric control means there is preferably employed an "On-Off-On" switch so that (a) the carriage elevator mechanism and the saw will be operated in unison when cutting, (b) either can be operated separately to permit the carriage to be raised or lowered when testing alinement with the saw idle or to bring the saw to a convenient height when changing blades, and (c) the saw can be operated with the carriage stationary to permit "honing" of the saw teeth before sharpening.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 2 is a vertical transverse section through the machine with parts broken away, the section being taken substantially on the line 2—2 in Fig. 3;

Fig. 3 is a detail vertical longitudinal section with parts broken away, taken substantially on the line 3—3 in Fig. 2;

Fig. 4 is a front edge view on an enlarged scale, of the top plate of the gallows section of the main frame showing the mechanism mounted thereon;

Fig. 5 is a bottom view of what is shown in Fig. 4;

Fig. 9 (Sheet 2) is an enlarged detail view showing in elevation a portion of the panel supporting ledge, one of the rollers thereon and the means for adjusting the ledge to dispose it at right angles to the track for the saw carriage;

Fig. 10 is a detail section taken on the line 10—10 in Fig. 9;

Fig. 14 (Sheet 3) is a detail view of the magnetic catch.

Figures 1, 12:
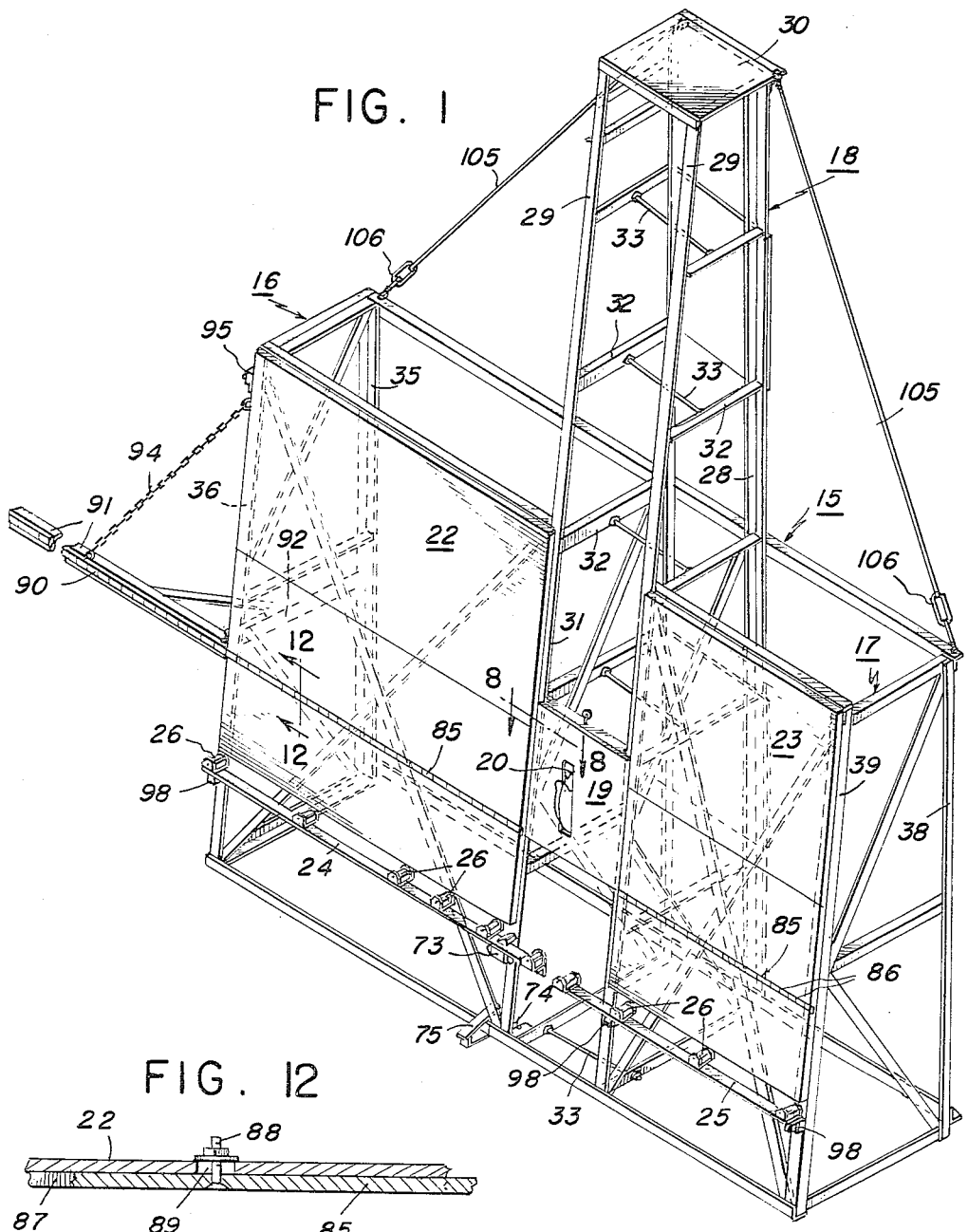
Fig. 1 is a perspective view of the main frame of the machine showing the saw carriage or table partially raised and a part of the extension rule broken away, the view being on such a small scale that, for the sake of clearness, parts of the complete machine have been omitted.
Fig. 12 (Sheet 1) is a detail longitudinal section, on an enlarged scale, showing the adjustment of one of the rules or scale bars.

Referring more in detail to the drawings the numeral 15 denotes as a whole a main frame which is long and narrow and preferably constructed of suitably connected structural metal bars, as quite clearly shown in Fig. 1.

The frame comprises longitudinally alined left hand and right hand upright sections 16 and 17 between which is a much higher central section or gallows 18. A saw table or carriage 19 is slidably mounted in the front face of the gallows and comprises a rectangular metal plate with a slot through which projects the circular blade 20 of a power saw 21 mounted on the rear of the plate. The carriage plate is flush with two rectangular face plates or tables 22 and 23 which substantially cover the front faces of the right and left frame sections respectively, and against which the panel to be cut rests while its lower edge is supported by a horizontal ledge adjacent the bottom of the main frame. The ledge is preferably formed of two angle metal bars 24 and 25 in longitudinal alinement and spaced apart for the passage of the saw blade between them. While the panel may be supported directly on the upper forwardly projecting flanges of these ledge bars, it preferably rests on a longitudinal series of spaced rollers 26 journaled in bearing brackets 27 fastened to those flanges to facilitate the sliding of the panel along the front plates. These plates 22, 23 may be perpendicular but they are preferably disposed in the upwardly and rearwardly inclined position shown in Fig. 2 so that with respect to at least large panels, it will not be necessary for the operator to hold the panel during the sawing operation.

The central tower or gallows section 18 is rectangular in cross section and is formed by two perpendicular rear corner posts 28 and two inclined front corner posts 29, the tops of the posts supporting a top plate 30. The front posts 29 are preferably metal T-bars with flanges 31 projecting toward each other to serve as tracks for the carriage 19, as presently explained. At vertical spaced points the front and rear posts are connected by cross bars 32 arranged in horizontally opposed pairs and connected by adjustable tie rods 33 for a purpose hereinafter described. The left section 16 has similar but shorter rear and front corner posts 35 and 36, and the right section 17 likewise has similar rear and front corner posts 38 and 39. All of the posts rest upon the floor but the various posts are connected by longitudinal and transverse bars, as will be understood upon reference to Fig. 1. Diagonal brace bars are also used, as shown. As above indicated the various bars of the main frame may be structural metal bars of angular or V-shape, T-shape, channel shape or flat.

Figure 7:
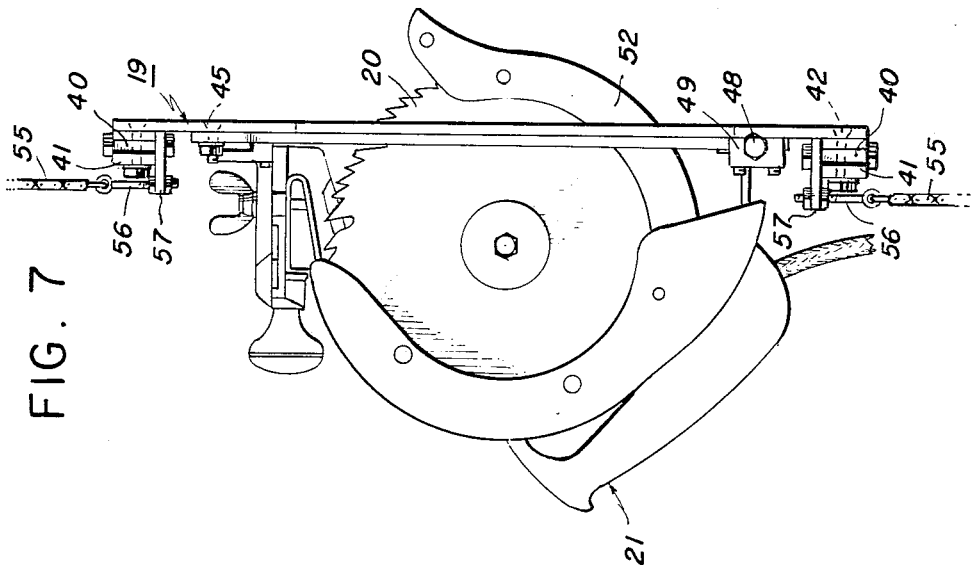
Fig. 7 is a side view of the parts shown in Fig. 6 and also the ends of the sprocket chain connected to the carriage.
Figure 6:
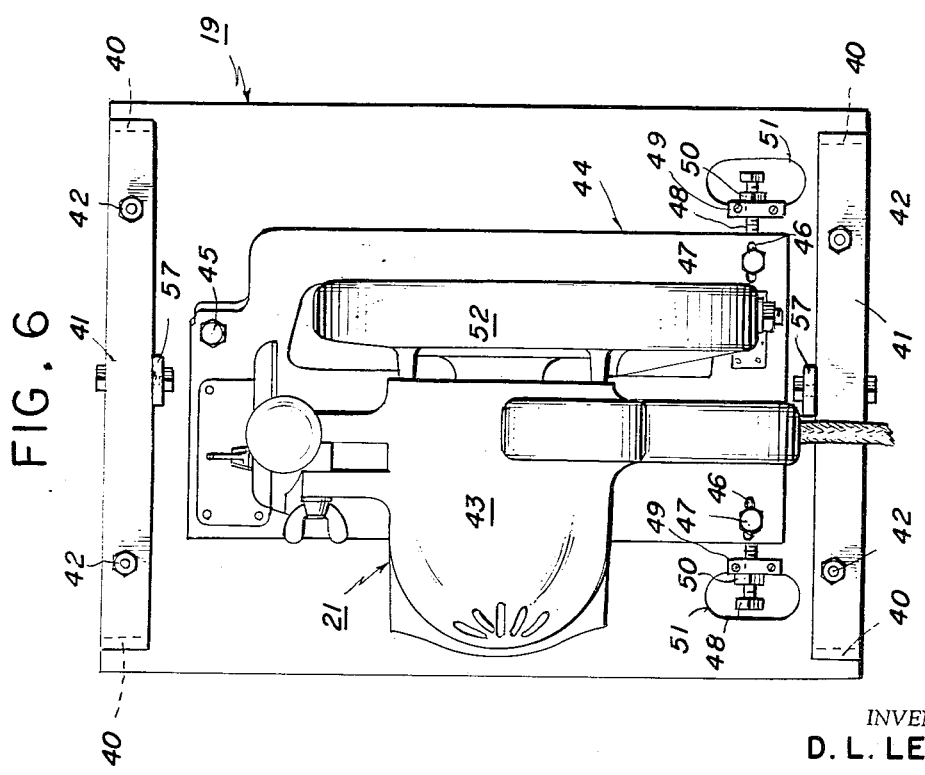
Fig. 6 is a rear elevation, on an enlarged scale, of the saw carriage showing the motor driven saw thereon and the means for angling the saw blade with respect to the path of movement of the carriage.
Figure 8:
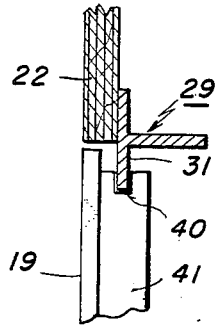
Fig. 8 is a detail horizontal section, on an enlarged scale, taken on the line 8—8 in Fig. 1.

The work tables or face plates 22 and 23 may be made of ½" plywood or hard-board and may have a front lamination or covering of sheet metal. They are suitably fastened to the respective front posts 29—36 and 29—39 and to longitudinal bars connecting the posts and diagonal brace bars. The opposed upright edges of these table plates overlie the oppositely projecting front flanges of the T bars 29 forming the front posts of the gallows, as will be understood upon reference to Fig. 8. The rectangular saw carriage plate 19 has free movement between those edges as it slides on the track flanges 31. The latter have an accurate sliding fit in channels 40 formed at the ends of upper and lower cross members or bars 41 secured to the back of the carriage plate 19 by fasteners 42, as shown in Figs. 6 and 7.

While any suitable motor driven saw 21 may be used, the saw illustrated is a Black and Decker 8" heavy duty hand saw. Its circular blade 20 is driven by an electric motor 43 which is tiltably mounted on a base plate 44 disposed against the rear face of the plate 19. The top portion of the plate 44 mounted on a pivot bolt or pin 45 in the upper part of plate 19 so that the plane in which the blade rotates may be angled with respect to the planes of the guides 40 so that the blade may be in true parallel relation to the tracks 31. The lower part of the saw base 44 is rectangular in shape and has transverse slots 46 to receive screws or bolts 47 to hold the power saw in an adjusted position. The base 44 may be accurately adjusted by screws 48 mounted in blocks 49 so that the ends of the 50 on the screws engage the blocks 49. The heads of the screws thrust against the side edges of the base. Lock nuts screws and the lock nuts are opposite openings 51 in the plate 19 so that they are exposed for adjustment from the front of the saw carriage. The saw is normally adjusted to make a cut at right angles to the plane of the panel, but if a bevel cut is desired the usual angular adjustment in the power saw will permit the cut to be angled up to 45°. The saw has the usual automatically retracting guard 52 which partially projects through the saw slot in the plate 19. It will be noted that the power saw and its flexible electric conductor cord are disposed out of the way in rear of the carriage and the tables 22, 23.

The saw carriage is reciprocated by a chain and sprocket drive as seen in Fig. 2. Mounted in bearings on a base plate at the bottom of the gallows frame is a pair of longitudinally extending shafts 53 and on the top of the top plate 30 is a similar pair of shafts 54. Around sprocket wheels on said shafts is trained a sprocket roller chain 55, the opposite ends of which are fastened to the top and bottom of the carriage plate 19. As seen in Figs. 2 and 7, the ends of the chain are connected to eye bolts 56 adjustable in plates 57 fastened by bolts to the centers of the bars 41 so that any slack in the chain may be taken up. The plate 30 has openings 58 (Fig. 5) through which the chain 55 passes and it also has openings 59 for a roller chain 60 driven through reduction gearing and a belt drive by a single phase reversible electric motor 61 mounted on one side of the gallows 18 just below the top plate 30, as seen in Fig. 3. The forward shaft 54 is the drive shaft for the chain and sprocket drive of the saw carriage, and it carries a second sprocket wheel 62 for the chain 60. The portion of the latter below the top plate passes around a sprocket 63 on the output shaft of speed reduction gearing in a casing 64 fastened to the bottom of the plate 30. The input shaft of the reduction gear 64 carries a pulley 65 for a V-belt 66 which also passes around a pulley 65 on the shaft of the motor 61. Also fastened on the bottom of the plate 30, as seen in Figs. 4 and 5, is the casing of a rotating limit switch 67 hereinafter described. The latter has a shaft 68 driven at the same speed as the output or drive shaft of the reduction gear 64 and the drive shaft 54 of the sprocket chain drive for the carriage. Shaft 68 has a sprocket 69 for a chain 70 which passes around a sprocket 71 on the shaft to which the sprocket 63 is fastened.

Figure 13:
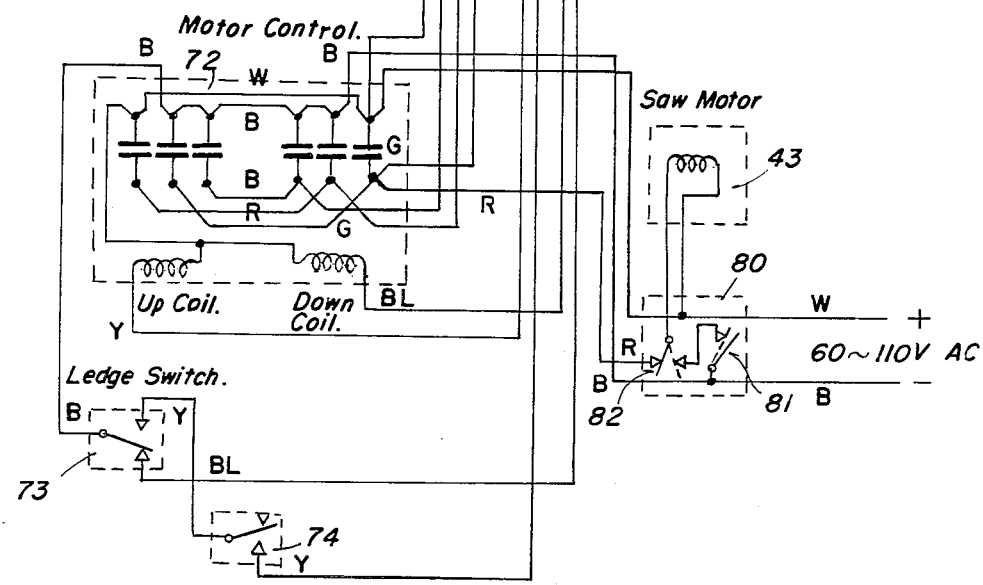
Fig. 13 (Sheet 6) is a circuit diagram of the automatic electron control means.
Figure 11:
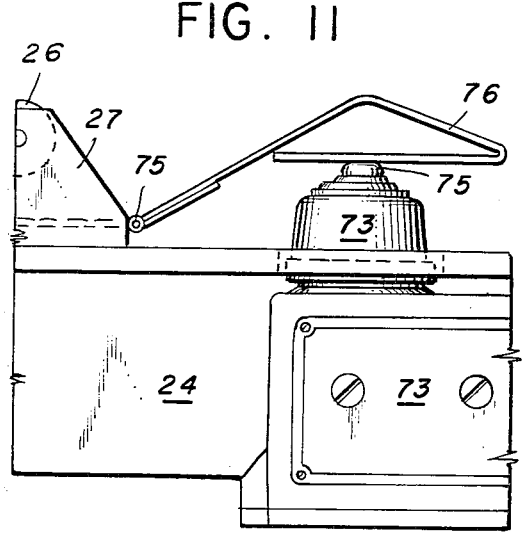
Fig. 11 (Sheet 6) is an enlarged view in elevation of the panel actuated switch and a portion of the ledge and of one of the rollers.

The rotating limit switch is used in connection with a magnetic three-pole reversing contactors or motor control mounted in a casing 72 fastened to the left side of the gallows as shown in Fig. 3, a panel operated ledge switch 73 such as shown in Fig. 11 and a foot or other manually operated switch 74 such as shown in Figs. 1, 2 and 13, to control the operation of both the saw motor 43 and the reversible motor 61, the circuits of these parts being shown in Fig. 13.

The switches 73 and 74 may be "Micro" switches of the push button or spring projected plunger type made by Micro Switch Company of Freeport, Illinois. The ledge switch 73 has a casing fastened to the angle metal ledge 24 adjacent to the left of the front of the gallows and its plunger 75 is depressed by an angular plate 76 extending longitudinally of the ledge and having one end pivoted at 75 to one of the roller brackets 27, as seen in Fig. 11. The top of the inverted V-shaped portion of the switch plate 76 is normally disposed in a plane above that passing through the tops of the rollers 26 so that it will be depressed by a panel placed above it on the ledge, the switch being normally open and being closed when the plate is depressed. See Fig. 2.

The foot switch 74 is located in front of the main frame at the bottom of the gallows section and includes a foot lever or treadle 75 extending forwardly and rearwardly with its outer end pivoted to a plate or bracket at the base of the frame, as seen in Fig. 2. A coil spring may be used to elevate the foot lever and when it is depressed it operates the plunger of the switch 74 to close the latter.

The rotating limit switch 57 may be of any suitable kind such as the Furnas Rotating Limit Switch No. L-3464 made by Furnas Electric Company. Such switches limit the number of turns made by a rotating shaft. Hence the linear motion of the sprocket chain 55 can be controlled by the switch by translating such linear motion to terms of rotation of the driving shaft and connecting the input shaft of the limit switch to the chain and sprocket drive. The mechanism of the limit switch consists of two separate switching units each operated by a cam. These cams engage with contact arms to open or close a circuit for each end of travel. The two cams are mounted on either side of a gear which in turn is driven by a worm gear attached to a shaft operating through the switch casing.

The control 72 for the reversible motor 61 is also of well known type such as the Y 5128 three pole magnetic contactors marketed by the Furnas Electric Company. It is diagrammatically shown in Fig. 13 and has an "Up coil" and a "Down coil" brought into operation by the closing of the circuits of the limit switch to cause the reversing of the motor 61. It will be seen on reference to the circuit diagram that with the weight of a panel on the ledge switch, pressure on the foot switch activates the "Up coil" of the magnetic contactor closing the necessary circuits to operate the motor 61 on the up cycle and also the saw motor; releasing pressure on the foot stops both motors; removal of the panel from the ledge switch activates the "Down coil" closing the circuit to the elevator motor 61 and reversing its direction. One half of the limit switch is cut into the circuit operating the "Up coil" of the contactor, the other half being cut into the "Down coil."

Mounted on the inner side of the right hand side of the gallows adjacent the top of the right frame section 17, is a switch casing 80 (Fig. 3) containing two manually operated switches. One is a single throw switch 81, shown in Fig. 13, to enable the power to be completely shut off. The other is a double throw or "On-Off-On" switch 82. When that switch is in one "On" position the saw will operate only through the magnetic controls of the cutting cycle. When in the other "On" position the saw runs independently of the magnetic controls so that the blade may be "honed" prior to sharpening. When in the "Off" position power does not flow to the saw motor and the different parts may be adjusted without danger to the operated. In Fig. 13 the letters represent the colors black, white, red, yellow, green and blue of the wires used in connecting the parts.

In order to save the time required to measure and mark the panels where cuts are to be made, there is embedded in the faces of the tables or plates 22 and 23 hardwood rules 85 on which are scale graduations 86 in units of linear measure. These rules extend through the lengths of the face plates and are disposed a short distance above their lower edges, as shown in Fig. 1. As seen in Fig. 12, these rules are rectangular strips slidably mounted in grooves 87 so that they may be adjusted with respect to the plane in which the saw blade moves. The rules carry a few spaced clamping bolts 88 which pass through slots 89 in the bottoms of the channels or grooves 87. The adjustment is slight but important in the cutting of the panels into accurate length pieces without marking them. The adjustment is necessary because the saw blades 20 must be replaced from time to time and they vary in thickness; and also because it may be necessary to adjust the saw carriage tracks 31, as later explained, to insure the travel of the carriage in a plane at right angles to the horizontal ledge on which the panel is supported.

Since the length of the left table or plate 22 is less than the length of a long panel which is to be cut crosswise, it is desirable to use at the left or feeding end of the frame an extension rule 90 that may be folded up against the end of the main frame when it is not needed. This foldable extension rule forms a continuation of the adjacent rule 85. The graduated rule 90 is adjustable on the long arm 91 of a right angular member, the short arm 92 of which is connected by a hinge 93 (Fig. 3) to a transverse bar at the end of the section 16, the two arms being connected by a diagonal brace, as seen in Fig. 1. A chain 94 connected between the upper portion of the section 16 and the long arm limits the downward movement of that arm and holds the extension rule in alignment with the adjacent rule. The right angular member is preferably made of angle metal and when swung up to its folded position a flange of the long arm 91 engages a magnetic catch 95 on the end of the frame so that the member will be held in an out of the way position. The catch may be a permanent magnet or an electro-magnet with poles projecting from a casing and engagable by the arm 91.

It is important that the ledges 24 and 25 be in alinement and at right angles to the travel of the saw. These ledges are therefore made adjustable as shown in Figs. 9 and 10 (sheet 2). At least at the ends of each ledge its depending flange 96 is supported in a slot 97 in the top of a block 98 fastened by a bolt 99 to one of the front posts. The bolt passes through a vertical slot in the flange so that the ledge be slightly raised or lowered by an adjusting screw 100 threaded into the bottom of the block and having its upper end thrusting against the bottom edge of the flange 96. The bolt has a lock nut 101 to hold it in adjusted position. After the ledge has been adjusted the bolt 99 is tightened to securely clamp the flange 96.

It is also important that the tracks 31 are parallel and that there is no sidewise movement of the saw carriage as it travels along the tracks. The tie rods 33 are therefore made adjustable, by having screw threaded ends which pass through openings in opposed cross bars 32 and nuts 107 (Fig. 3) are applied to the rods on opposite sides of the bars 32. While the machine is adjusted before shipment to insure a true square cut, the alinement may be readily checked and adjusted by using a 4' x 8' plywood panel that is exactly square and flat. It is placed on end on the left hand ledge so that it will hold the ledge switch depressed. With the saw motor switch in "Off" position the foot switch may be operated to successively move the saw carriage upwardly to different positions, and in each position the saw carriage is tested for tightness or looseness so that the tie rods 33 may be successively adjusted to provide a close tolerance yet free enough to prevent binding between the carriage and the tracks 31. The test panel is also used in adjusting the ledges 24 and 25, by positioning the edge of the panel in contact with the left side of the saw blade and then moving the saw carriage upwardly. If the relation of the saw blade and edge of the panel changes, the supporting ledges are adjusted. Guy rods 105, made adjustable by turnbuckles 106 are provided between the rear upper corners of the frame sections 16 and 17 and the tops of the rear posts 18 of the gallows section of frame for the purpose of holding and adjusting the portion of gallows frame above the top of face plates 22 and 23 in a straight line with the portion of gallows section that is below the top of the face plates 22 and 23.

In operating the machine the material to be cut is placed on the rollers and ledge switch and then rolled to the point on the rule indicating the desired dimension. The operator then depresses the foot switch and the saw will cut and feed itself through the material. The foot is removed from the switch after the cut is finished and the saw guard snaps into position covering the saw, the latter and the carriage being thus stopped. When the material is removed from the ledge switch, the carriage will automatically return to its starting position ready for the next cut. If the material is removed from the switch before taking the foot from the foot switch, no harm will result. Doing so interrupts the sequence of the electrical cycle and permits the saw table to continue upward. The electrical circuits will return the carriage to its starting position after it travels the full upward stroke. The direction of travel of the saw carriage may be reversed at any point by momentarily depressing the ledge switch until the carriage stops climbing.

It has been found that the machine effects a great saving in time and labor. Its use requires only one operator and he does not have to adjust gauges or mark the material. The panel is supported at an 84° angle and the machine is long and narrow so that it may be placed adjacent an aisle or alley-way. It requires only about 28 square feet of floor space whereas conventional machines for cutting large panels require 400 square feet or more for the machine and space to maneuver the panels. The machine is safe against accidental starting, all circuits being dead until the panel is placed on the ledge. The weight of the panel on the ledge switch livens the necessary circuits for the cutting stroke. The foot pedal allows instant starting and stopping and leaves both hands of the operator to hold the panel, that being necessary only for small and lightweight panels. The adjustment of the ledges permits either end of each ledge to be raised or lowered to provide perfect alinement with each other and at right angles to the gallows. The adjustable cross ties between the two sides of the gallows accomplish accurate parallel alinement of the saw carriage tracks. The three point saw mounting makes it possible to insure that the back edge of the saw blade follows the cutting edge of the blade perfectly with pressure being equal on both sides of the blade. Without such alinement the cut would have a tendency to "crawl" or pull the material sidewise and to cut out of square. These adjustments insure true square cuts which are essential to accurately cut a large panel into pieces of specified size.

From the foregoing, taken in connection with the accompanying drawings, it will be seen that novel and advantageous provision has been made for carrying out the objects of the invention, and while preferences have been disclosed, attention is invited to the possibility of making variations within the scope of the invention as claimed.

I claim:

1. A sawing machine for cutting a panel of plywood or the like while it is supported in an upright position, comprising an elongated upright frame having a central section between two side sections with alined front faces, spaced longitudinally alined ledges horizontally disposed near the bottoms of the side sections to slidably support a panel resting against the front faces of the side sections, a saw carriage slidably mounted in the front of said central section, an electric motor driven saw mounted on the rear of said carriage, a sprocket chain drive mounted in said central section for reciprocating said saw carriage, and electrical operating means, including a manually actuated switch, for automatically controlling the operation of said sprocket chain drive and the motor of said saw.

2. The structure of claim 1 together with means connected between said ledges and said side sections to angularly adjust the ledges vertically.

3. The structure of claim 1 together with rule strips graduated in units of linear measure set horizontally in channels in the front faces of said side sections and longitudinally adjustable therein.

4. The structure of claim 3 together with an extension rule member at one end of the frame to provide a continuation of the adjacent rule strip, said member including an arm hinged at one end and swingable upwardly against the adjacent end of the frame, a flexible element connected between an upper portion of the frame and an outer portion of the member to limit its downward swinging, and catch means on the frame to hold the member in elevated position.

5. The structure of claim 1 in which said central section of the frame includes front and rear pairs of metal corner posts connected by vertically spaced cross bars, the opposed cross bars being connected by adjustable tie rods, the front pair of corner posts having opposed inwardly projecting flanges to form tracks for the slidable saw carriage.

6. The structure of claim 5 together with means mounting said ledges for angular adjustment in a substantially vertical plane on the side sections of the frame.

7. The structure of claim 1 in which said saw carriage is a rectangular plate with a slot through which the blade of the saw projects, and the saw has a body disposed against the rear face of the carriage plate, a pivot connecting the upper part of the saw body to said plate for angular adjustment of the saw blade, a slot and bolt connection between the lower portion of the saw body and said plate, and adjusting screws mounted on the lower portion of the rear face of said plate and engaged with the opposite sides of the saw body, said plate having openings opposite said adjusting screws to permit adjustment of the latter from the front of the plate.

8. The structure of claim 1 in which said ledges are angle metal bars with downwardly projecting flanges spaced from the side sections of the frame and forwardly projecting horizontal flanges having on their tops longitudinally spaced rollers on which the panel rests, blocks mounted at longitudinally spaced points on the side sections of the frame and having slots opening through their tops to adjustably receive the depending flanges of the ledges, adjusting screws in the bottoms of the blocks to thrust against the lower edges of said depending flanges, and clamping bolts passing through the slotted upper portions of the blocks and through vertical slots in said flanges to hold the ledges in adjusted positions.

9. The structure of claim 1 in which said electrical operating means also includes a switch mounted on one of said ledges and actuated by the weight of a panel placed on said one ledge; the circuit through said manually actuated switch being controlled by said ledge switch.

10. The structure of claim 9 in which said electrical operating means also includes a rotating limit switch, a reversible electric motor with reduction gearing for actuating the sprocket chain drive for the saw carriage and the limit switch, and a three pole magnetic contactor control for controlling the operation of the saw motor, the reversible motor and the limit switch, whereby when a panel is on the ledge switch and the manually operated switch is closed, the saw will be driven and the carriage moved upwardly for its cutting stroke, when the manually operated switch is opened, the saw and carriage will stop, and when the panel is removed from the ledge switch, the carriage will automatically return to its starting position at the bottom of the frame.

11. The structure of claim 10 together with an On-Off-On switch included in said electrical operating means, whereby when this switch is in one "On" position the saw and its carriage will be operated only through the magnetic controls of the cutting cycle, when in the other "On" position the saw will run independently of the magnetic controls and when in the "Off" position only the saw motor will be actuated.

12. The structure of claim 1 in which the frame is made of metal members and the central section includes front and rear pairs of corner posts connected by vertically spaced cross bars with adjustable tie rods between opposed cross bars, said corner posts extending above the tops of the side sections and being connected by a top plate, the two front corner posts being formed by T-shaped metal bars which have their oppositely extending flanges at the front of the frame, the said flanges which extend toward each other serving as tracks for the carriage, the others of said flanges supporting rectangular plates which form the front faces of the two side sections of the frame, said carriage including a rectangular metal plate with top and bottom cross bars secured on its rear face and having grooved ends to receive said tracks to dispose the carriage plate in the plane of said front face plates, said sprocket chain drive including pairs of longitudinally extending shafts carrying sprocket wheels, one pair of said shafts being mounted on said top plate and the other pair at the bottom of the central frame section and a chain trained around said sprocket wheels and having its ends adjustably fastened to said cross bars on the carriage plate, and a pair of adjustable tie rods connected between the rear corners of said top plate of the central frame section and the rear corners of the two side sections of the frame.

References Cited in the file of this patent

UNITED STATES PATENTS 2,347,359  Miller _____ Apr. 25, 1944

FOREIGN PATENTS 473,491  Great Britain _____ Oct. 14, 1937